(12) United States Patent
Zhang

(10) Patent No.: US 8,719,358 B2
(45) Date of Patent: May 6, 2014

(54) METHOD AND SERVER FOR TRANSFERRING MESSAGE

(75) Inventor: Li Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 13/615,880

(22) Filed: Sep. 14, 2012

(65) Prior Publication Data

US 2013/0024533 A1 Jan. 24, 2013

Related U.S. Application Data

(63) Continuation of application No. PCT/CN2011/078766, filed on Aug. 23, 2011.

(30) Foreign Application Priority Data

Aug. 27, 2010 (CN) .......................... 2010 1 0267122

(51) Int. Cl.
*G06F 15/16* (2006.01)

(52) U.S. Cl.
USPC ........................... 709/206; 709/205; 709/219

(58) Field of Classification Search
USPC .................. 709/204, 205, 206, 207, 217, 219
See application file for complete search history.

(56) References Cited

U.S. PATENT DOCUMENTS

| 8,401,009 | B1 * | 3/2013 | Dorsey et al. | 370/389 |
| 8,434,095 | B2 * | 4/2013 | Yu | 719/313 |
| 8,504,481 | B2 * | 8/2013 | Motahari et al. | 705/51 |

FOREIGN PATENT DOCUMENTS

| CN | 101277318 A | 10/2008 |
| CN | 101378368 A | 3/2009 |
| CN | 101425093 A | 5/2009 |
| CN | 101465817 A | 6/2009 |
| CN | 101520791 A | 9/2009 |
| CN | 101692658 A | 4/2010 |
| WO | WO-2009057905 A2 | 5/2009 |

OTHER PUBLICATIONS

Written Opinion (English Translation), International application No. PCT/CN2011/078766, Dec. 1, 2011.
International Preliminary Report on Patentability (English Translation), International application No. PCT/CN2011/078766, Mar. 5, 2013.
Office Action (and translation) from Korean Application No. 10-2012-7023775 dated Sep. 27, 2013.
Office Action (and translation) from Chinese Application No. 201010267122.9 dated Sep. 4, 2013.

* cited by examiner

*Primary Examiner* — Viet Vu
(74) *Attorney, Agent, or Firm* — Marshall, Gerstein & Borun LLP

(57) ABSTRACT

A method and server for transferring a message, belonging to the IM field. The method includes: receiving a message body from a first user through a first client terminal, finding an address of a second client terminal, and sending the message body to the second client terminal. The server includes a receiving module and a sending module.

16 Claims, 3 Drawing Sheets

---

101 — Receiving a message body sent from a first user through a first client terminal, on which the first user logs. The message body includes a message and an account of a second user in a first application 102 — Finding an address of the second client terminal, on which the second user logs, through the account of the second user in the first application, and sending the message body to the second client terminal

# METHOD AND SERVER FOR TRANSFERRING MESSAGE

CROSS-REFERENCE TO RELATED APPLICATIONS

This is a continuation of International Patent Application No. PCT/CN2011/078766 filed Aug. 23, 2011, which claims the priority benefit of Chinese Patent Application No. CN 201010267122.9 filed Aug. 27, 2010, the entire respective disclosures of which are incorporated herein by reference.

FIELD OF THE INVENTION

This application claims the benefit of priority from Chinese Patent Application, No. 201010267122.9, entitled "Method and Server for transferring Message" and filed on Aug. 27, 2010, the entire contents of which are hereby incorporated by reference.

The present invention relates to an Instant Messaging (IM) field, and more particularly, to a method and server for transferring a message.

The present invention relates to an Instant Messaging (IM) field, and more particularly, to a method and server for transferring a message.

BACKGROUND OF THE INVENTION

The network instant messenger has been developed rapidly, accepted by most of users, and become an indispensable tool in people's work and life. Therefore, people have put forward higher requirements for ease of use of the instant messenger.

Take the blog for example, the blog, also being translated as the web log, etc, is a website which is generally managed by users and used for posting information from time to time. The information in the blog does not target for explicit objects. The information published by a user in his/her blog is for all users who log on to this blog. All users logged on to this blog may see the information published by the user in the blog.

However, in some scenarios, the user wishes that the information published by himself/herself may only be seen by specific users. However, the method for transferring a message in the existing blog is for all users, and is not targeted.

SUMMARY OF THE INVENTION

An embodiment of the present invention provides a method for transferring a message, by which the method may transfer a message published for associated users to a specific user.

Another embodiment of the present invention provides a server for transferring a message, by which the system may transfer a message published for associated users to a specific user.

In order to achieve the objective of the present invention, the technical scheme of the present invention includes:

A method for transferring a message, including:
receiving a message body from a first user through a first client terminal, on which the first user logs, the message bogy including a message and an account of a second user in a first application;
finding an address of a second client terminal, on which the second user logs with the account of the second user in the first application, and sending the message body to the second client terminal.

A server, including:
a receiving module, configured to receive a message body sent from a first user through a first client terminal, on which the first user logs, the message body including a message and an account of a second user in a first application; and
a sending module, configured to find an address of a second client terminal, on which the second user logs with the account of the second user in the first application, and send the message body to the second client terminal.

A computer program product includes computer program codes, for executing, when being executed by a computer unit, the above methods.

A readable storage medium is configured to store the above computer program codes.

It can be seen from the above technical scheme that in the method and system provided by embodiments of the present invention, the account of the specific user is carried in the message body of the message published for the associated users, the client terminal, on which the specific user logs, is found according to the account of the specific user, and the message body is sent to the client terminal for display, by which the message published for the associated users is transferred to the specific user.

BRIEF DESCRIPTION OF DRAWINGS

To make the technical solution of the present invention more apparent, brief introduction is given to drawings that are to be used in embodiments. It is apparent that the drawings described hereafter are merely some embodiments of the present invention. An ordinary skilled in the art may obtain other drawings according to these drawings without creative work.

DETAILED DESCRIPTION OF THE INVENTION

In order to make objectives, technical solutions and advantages of the present invention more apparent, the present invention will be described clearly and completely hereinafter with reference to accompanying drawings in embodiments of the present invention. It is apparent that the embodiments described hereafter are only part of the embodiments of the present invention, but not all of the embodiments. On the basis of the embodiments of the present invention, other embodiments obtained by an ordinary skilled in the art of the present invention without creative work are protected by the present invention.

Embodiment 1

Figure 1:
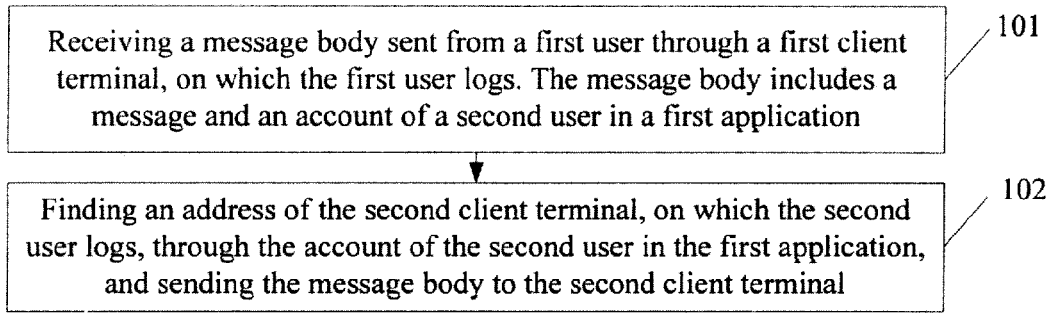
FIG. 1 is a flow chart illustrating a method for transferring a message in accordance with embodiment 1 of the present invention.

Refer to FIG. 1, this embodiment provides a method for transferring a message. This method specifically includes the following blocks."

Block 101: A message body sent from a first user through a first client terminal, on which the first user logs, is received. The message body includes a message and an account of a second user in a first application.

Block 102: An address of a second client terminal, on which the second user logs, is found with the account number of the second user in the first application, and the message body is sent to the second client terminal.

In this block, the message body is displayed on the second client terminal.

Furthermore, after block 101, the method further includes:

A list of listeners of the first user is found according to the account of the first user in the first application. The list of the listeners stores an account of each listener in the first application. An address of a third client terminal, on which a corresponding listener logs, is found according to the account of each listener in the first application, and the message body is sent to the third client terminal for display. Here, since the first user has multiple listeners, there are multiple third client terminals.

The method provided by this embodiment of the present invention implements a solution for transferring a message published for associated users to a specific user. The solution is implemented by finding a client terminal, on which the specific user logs, through the account of the specific user carried in a message body of the message published for the associated users, and sending the message body to the client terminal. Furthermore, the message may be transferred to other associated users through the set list of the listeners.

Figure 2:
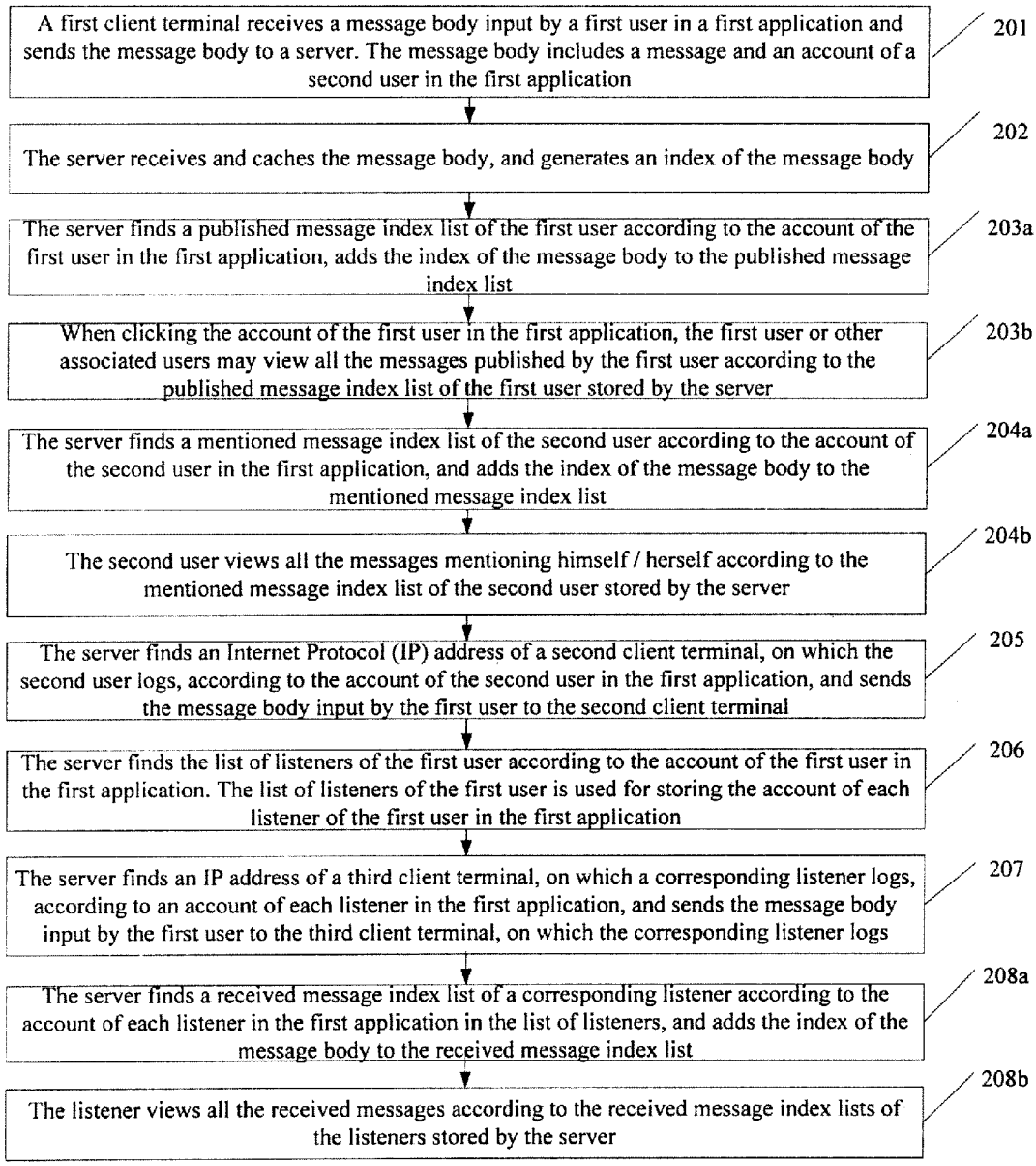
FIG. 2 is another flow chart illustrating a method for transferring a message in accordance with embodiment 1 of the present invention.

The method provided by this embodiment applies to the IM field. Refer to FIG. 2, the method for transferring the message is described hereafter in accordance with specific embodiments. The method specifically includes:

Block 201: A first client terminal receives a message body input by a first user in a first application and sends the message body to a server. The message body includes a message and an account of a second user in the first application.

The first application may be an IM application, such as a microblogging.

The message body may adopt a format of message@account of the second user in the first application. @ is a prompt which is commonly used and used for denoting the account of the second user. The prompt commonly used by the second user may be any of other symbols, and this embodiment of the present invention does not make limitation on it. The account in this embodiment of the present invention may be used for uniquely identifying a second user in the first application.

For instance, a message sent from the first user to the second user in the first application is "Come to the meeting quickly". The account of the second user in the first application is "@testB". Therefore, the message body input by the first user is "Come to the meeting quickly@testB".

Furthermore, while sending the message body, the first client terminal may send the account of the first user in the first application to the server.

Block 202: The server receives and caches the message body, and generates an index of the message body.

Block 203*a*: The server finds a published message index list of the first user according to the account of the first user in the first application, adds the index of the message body to the published message index list.

Specifically, the server stores corresponding relationships between the accounts of all users in the first application and published message index lists, and finds the published message index list corresponding to the account of the first user in the first application according to the corresponding relationships.

The published message index list is used for recording an index of all messages published by the user. All messages published by the user may be found according to the index, so that the user himself/herself or other associated users may view all the messages published by the user according to the published message index list of the user to have a whole picture of the user.

Block 203*b*: When triggering or starting the account of the first user in the first application, the first user or other associated users may view all the messages published by the first user according to the published message index list of the first user stored by the server.

Block 204*a*: The server finds a mentioned message index list of the second user according to the account of the second user in the first application, and adds the index of the message body to the mentioned message index list.

Specifically, the server stores corresponding relationships between the accounts of all the users in the first application and the mentioned message index lists, and may find a mentioned message index list corresponding to the account of the second user in the first application according to the corresponding relationships.

The mentioned message index list is used for recording an index of all messages, in which a user is mentioned by other associated users. All messages, in which the user is mentioned may be found through the index, so that a user may find all messages, in which the user is mentioned according to its mentioned message index list, to have a whole picture of a degree that the user is paid attention to.

Block 204*b*: The second user views all the messages mentioning himself/herself according to the mentioned message index list of the second user stored by the server.

Block 205: The server finds an Internet Protocol (IP) address of a second client terminal, on which the second user logs, according to the account of the second user in the first application, and sends the message body input by the first user to the second client terminal, so that the second client terminal receives and displays the message body input by the first user.

Furthermore, the second client terminal may display the account of the transmitter (i.e., the first user) of the message body in the first application, so that the second user obtains the relevant information of the first user from the server according to the account of the first user in the first application and views the relevant information.

The relevant information may be information, all the published messages, all the received messages or mentioned messages, etc. The information may be a nickname, etc.

Block 206: The server finds the list of listeners of the first user according to the account of the first user in the first application. The list of listeners of the first user is used for storing the account of each listener of the first user in the first application.

Specifically, the server stores the corresponding relationship between the account of each user in the first application and the list of the listeners, and may find the list of listeners corresponding to the account of the first user in the first application according to the corresponding relationship. The listeners may be called the listening users.

Block 207: The server finds an IP address of a third client terminal, on which a corresponding listener logs, according to an account of each listener in the first application, and sends the message body input by the first user to the third client terminal, on which the corresponding listener logs, so that the third client terminal, on which the corresponding listener logs, receives and displays the message body input by the first user.

Furthermore, the third client terminal, on which the corresponding listener logs, may further display the transmitter, i.e. the account of the first user in the first application, of the message body. The listener respectively obtains and views relevant information of the second user or the first user according to the account of the second user in the first application or the account of the first user in the first application in the message body.

Block 208*a*: The server finds a received message index list of a corresponding listener according to the account of each listener in the first application in the list of listeners, and adds the index of the message body to the received message index list.

Specifically, the server stores a corresponding relationship between the account of each listener in the first application and the received message index list, and may find a received message index list corresponding to the account of each listener in the first application.

The received message index list is used for recording an index of all messages received by a user. All messages received by the user may be found with the index, so that the user views all the received messages according to his/her received message index list.

Block 208*b*: The listener views all the received messages according to the received message index lists of the listeners stored by the server.

Furthermore, the above process relates to a generation process of the published message index list of the first user, the mentioned message index list of the second user, and the received message index list of the listener. In actual application, the server stores the published message index list, mentioned message index list and received message index list corresponding to the account of each user, and generation process of the three kinds of index lists is the same as that of the published message index list of the first user, the mentioned message index list of the second user, and the received message index list of the listener, and is not repeated here.

Furthermore, in order to combine with the existing mature application better, this embodiment may further associate the first application with other applications, and apply the information in other applications to the first application. Taking the second application for example, the second application may be an IM application. The second application includes:

The server establishes a corresponding relationship between the account of the user in the first application and a number of the user in the second application. The number may be used for uniquely identifying a user. The published message index list, mentioned message index list, received message index list and the address of the client terminal respectively correspond to the number of the user in the second application. Therefore, blocks 203-208 in the above process may further include:

The server obtains the corresponding number in the second application through the account in the first application and finds information, such as the corresponding published message index list, mentioned message index list, received message index list, and/or the address of the client terminal through the number in the second application.

Furthermore, the user information of the second application may be used in the first application according to the corresponding relationship. On the one hand, the user information of the user in the second application may be displayed on the first application. For instance, the signature of the user in the IM application may be displayed on the mircoblogging.

The information of the user in the first application may be generated according to the user information of the user in the second application. For instance, the buddies of the user in the IM application may be taken as the listeners of the microblogging.

With the method provided by this embodiment of the present invention, the account of a specific user is carried in the message body of the message published for the associated users, the client terminal, on which the user logs is found with the account of the specific user, and the message body is sent to the client terminal for display, by which the message published for the associated users is sent to the specific user. Furthermore, the message may be transferred to other associated users through the list of listeners.

Embodiment 2

Figure 3:
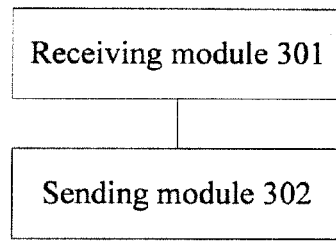
FIG. 3 is a schematic diagram illustrating structure of a server in accordance with embodiment 2 of the present invention.

Refer to FIG. 3, this embodiment provides a server, including: a receiving module 301 and a sending module 302.

The receiving module 301 is configured to receive a message body sent from a first user through a first client terminal, on which the first user logs. The message body includes: a message and an account of a second user in a first application.

The sending module 302 is configured to find an address of a second client terminal, on which the second user logs, with the account of the second user in the first application, and send the message body to the second client terminal.

Figure 4:
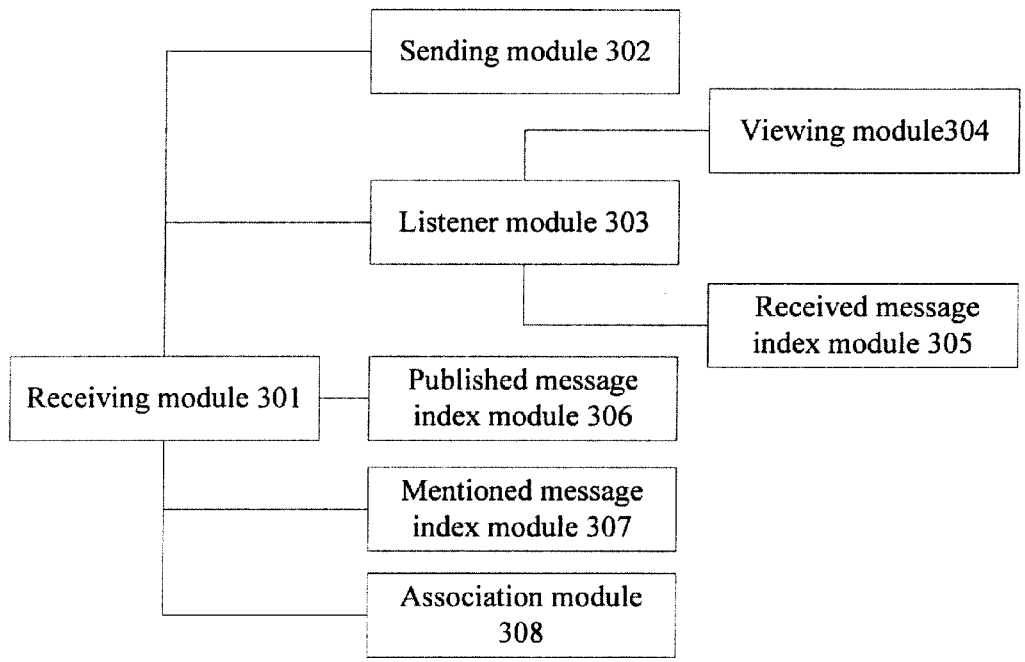
FIG. 4 is another schematic diagram illustrating structure of a server in accordance with embodiment 2 of the present invention.

Furthermore, refer to FIG. 4, the server further includes:
a listener module 303, configured to find, after receiving the message body sent from the first user through the first client terminal, on which the first user logs, a list of listeners of the first user according to the account of the first user in the first application. The list of listeners stores the account of each listener in the first application.

The listener module 303 is further configured to find an address of a third client terminal, on which a corresponding listener logs, according to the account of each listener in the first application, and send the message body to the third client terminal for display.

Furthermore, the server further includes:
a viewing module 304, configured to, after sending the message body to the third client terminal for display, find a published message index list of the second user when detecting an operation that a corresponding listener triggers or starts the account of the second user in the first application in the message body, and send all the messages published by the second user corresponding to the published message index list to corresponding listeners.

Furthermore, the server further includes: a received message index module 305, configured to generate, after receiving the message body sent from the first user through the first client terminal, on which the first user logs, an index of the message body, find, after finding the list of listeners of the first user, a received message index list of a corresponding listener according to the account of each listener in the first application, and add the index to the received message index list, so that the corresponding listener may view messages received by himself/herself according to the received message index list.

Furthermore, the server further includes: a published information index module 306, configured to generate, after receiving the message body sent from the first user through the first client terminal, on which the first user logs, the index of the message body, find the published message index list of the first user according to the account of the first user in the first application, and add the index to the published information index list, so that all users may view all the messages published by the first user according to the published message index list of the first user.

Furthermore, the server further includes: a mentioned message index module 307, configured to generate, after receiving the message body sent from the first user through the first client terminal, on which the first user logs, the index of the message body, find the mentioned message index list of the second user according to the account of the second user in the first application, and add the index to the mentioned message index list, so that the second user view all the messages of the second user that are mentioned according to the mentioned message index list of the second user.

Furthermore, the server further includes: an association module 308, configured to establish corresponding relationships between the accounts of all users in the first application and the numbers of all the users in the second application, and apply user information of the second application to the first application.

The server provided by this embodiment has the same concept as that of the embodiments of the method. Refer to the embodiments of the method for the specific implementation process, which is not repeated here.

In the server provided by this embodiment, the account of the specific user is carried in the message body of the message published for the associated users, the client terminal, on which the specific user logs, is found according to the account of the specific user, and the message body is sent to the client terminal for display, so that the message is transferred to the specific user. In addition, the message may be transferred to other associated users through the list of listeners.

Part or all contents in the technical scheme provided by the above embodiments may be implemented with software programming. The software programs of the technical scheme are stored in readable storage media, such as the hard disk, CD-ROM or floppy disk of the computer.

The foregoing description only describes preferred embodiments of the present invention and is not used for limiting the protection scope thereof. Any modification, equivalent substitution, or improvement made without departing from the spirit and principle of the present invention should be covered by the protection scope of the present invention.

The invention claimed is:

1. A method for transferring a message, the method comprising:
receiving a message body from a first user through a first client terminal, on which the first user logs, the message body comprising a message and an account of a second user in a first application;
finding an address of a second client terminal, on which the second user logs with the account of the second user in the first application, and sending the message body to the second client terminal; wherein
after receiving the message body, generating an index of the message body and finding a published message index list of the first user according to the account of the first user in the first application, and adding the index of the message body to the published message index list;
establishing corresponding relationships between accounts of all users in the first application and numbers of the users in a second application; and
applying user information of the second application to the first application according to the corresponding relationships;
wherein the first application is a microblogging application, and the second application is an Instant Messaging application; and
wherein applying the user information of the second application to the first application according to the corresponding relationships comprises (i) displaying a signature of the first user in the Instant Message application on the microblogging and (ii) taking buddies of the first user in the Instant Messaging application as the listeners of the microblogging.

2. The method of claim 1, after receiving the message body, further comprising:
finding a stored list of listeners of the first user according an account of the first user in the first application, the list of listeners storing an account of each listener in the first application; and
finding an address of a third client terminal, on which a corresponding listener logs, according to an account of each listener in the first application, and sending the message body to the third client terminal for display.

3. The method of claim 2, after sending the message body to the third client terminal for display, further comprising:
finding, when detecting an operation that the corresponding listener triggers or starts the account of the second user in the first application in the message body, a stored published message index list of the second user according to the account of the second user in the first application, sending all messages published by the second user corresponding to the published message index list to the corresponding listener.

4. The method of claim 2, after receiving the message body, further comprising:
generating an index of the message body;
wherein after finding the list of listeners of the first user, the method further comprises:
finding a received message index list of the corresponding listener according to an account of each listener in the first application, and adding the index of the message body to the received message index list.

5. A method for transferring a message, the method comprising:
receiving a message body from a first user through a first client terminal, on which the first user logs, the message body comprising a message and an account of a second user in a first application;
finding an address of a second client terminal, on which the second user logs with the account of the second user in the first application, and sending the message body to the second client terminal; wherein
after receiving the message body, generating an index of the message body and finding a mentioned message index list of the second user according to the account of the second user in the first application, and adding the index of the message body to the mentioned message index list;
establishing corresponding relationships between accounts of all users in the first application and numbers of the users in a second application; and
applying user information of the second application to the first application according to the corresponding relationships,
wherein the first application is a microblogging application, and the second application is an Instant Messaging application, and
wherein applying the user information of the second application to the first application according to the corresponding relationships comprises (i) displaying a signature of the first user in the Instant Message application on the microblogging and (ii) taking buddies of the first user in the Instant Messaging application as the listeners of the microblogging.

6. The method of claim 5, after receiving the message body, further comprising:
   finding a stored list of listeners of the first user according an account of the first user in the first application, the list of listeners storing an account of each listener in the first application; and
   finding an address of a third client terminal, on which a corresponding listener logs, according to an account of each listener in the first application, and sending the message body to the third client terminal for display.

7. The method of claim 6, after sending the message body to the third client terminal for display, further comprising:
   finding, when detecting an operation that the corresponding listener triggers or starts the account of the second user in the first application in the message body, a stored published message index list of the second user according to the account of the second user in the first application, sending all messages published by the second user corresponding to the published message index list to the corresponding listener.

8. The method of claim 6, after receiving the message body, further comprising:
   generating an index of the message body;
   wherein after finding the list of listeners of the first user, the method further comprises:
   finding a received message index list of the corresponding listener according to an account of each listener in the first application, and adding the index of the message body to the received message index list.

9. A server, comprising:
   a receiving module, configured to receive a message body sent from a first user through a first client terminal, on which the first user logs, the message body comprising a message and an account of a second user in a first application; and
   a sending module, configured to find an address of a second client terminal, on which the second user logs with the account of the second user in the first application, and send the message body to the second client terminal;
   a published information index module, configured to generate, after receiving the message body sent from the first user through the first client terminal, on which the first user logs, an index of the message body, find a published message index list of the first user according to the account of the first user in the first application, and add the index of the message body to the published message index list; and
   an association module, configured to establish corresponding relationships between accounts of all users in the first application and numbers of the users in a second application and to apply user information of the second application to the first application according to the corresponding relationships;
   wherein the first application is a microblogging application, and the second application is an Instant Messaging application; and
   wherein the association module is further configured to display a signature of the first user in the Instant Message application on the microblogging and to take buddies of the first user in the Instant Messaging application as the listeners of the microblogging.

10. The server of claim 9, further comprising:
    a listener module, configured to find, after receiving the message body sent from the first user through the first client terminal, on which the first user logs, a list of listeners of the first user according to an account of the first user in the first application, the list of listeners storing an account of each listener in the first application; and
    find an address of a third client terminal, on which a corresponding listener logs, according to the account of each listener in the first application, and send the message body to the third client terminal for display.

11. The server of claim 10, further comprising:
    a viewing module, configured to find, after sending the message body to the third client terminal for display, a published message index list of the second user according to the account of the second user in the first application when detecting an operation that the corresponding listener triggers or starts the account of the second user in the first application in the message body, and send all messages published by the second user corresponding to the published message index list to the corresponding listener.

12. The server of claim 10, further comprising:
    a received message index module, configured to generate an index of the message body after receiving the message body sent from the first user through the first client terminal, on which the first user logs, and
    find, after finding the list of listeners of the first user, a received message index list of the corresponding listener according to an account of each listener in the first application, and add the index to of the message body the received message index list.

13. A server, comprising:
    a receiving module, configured to receive a message body sent from a first user through a first client terminal, on which the first user logs, the message body comprising a message and an account of a second user in a first application; and
    a sending module, configured to find an address of a second client terminal, on which the second user logs with the account of the second user in the first application, and send the message body to the second client terminal;
    a mentioned message index module, configured to generate, after receiving the message body sent from the first user through the first client terminal, on which the first user logs, an index of the message body, find a mentioned message index list of the second user according to the account of the second user in the first application, and add the index of the message body to the mentioned message index list; and
    an association module, configured to establish corresponding relationships between accounts of all users in the first application and numbers of the users in a second application and to apply user information of the second application to the first application according to the corresponding relationships;
    wherein the first application is a microblogging application, and the second application is an Instant Messaging application; and
    wherein the association module is further configured to display a signature of the first user in the Instant Message application on the microblogging and to take buddies of the first user in the Instant Messaging application as the listeners of the microblogging.

14. The server of claim 13, further comprising:

a listener module, configured to find, after receiving the message body sent from the first user through the first client terminal, on which the first user logs, a list of listeners of the first user according to an account of the first user in the first application, the list of listeners storing an account of each listener in the first application; and find an address of a third client terminal, on which a corresponding listener logs, according to the account of each listener in the first application, and send the message body to the third client terminal for display.

15. The server of claim 14, further comprising:

a viewing module, configured to find, after sending the message body to the third client terminal for display, a published message index list of the second user according to the account of the second user in the first application when detecting an operation that the corresponding listener triggers or starts the account of the second user in the first application in the message body, and send all messages published by the second user corresponding to the published message index list to the corresponding listener.

16. The server of claim 14, further comprising:

a received message index module, configured to generate an index of the message body after receiving the message body sent from the first user through the first client terminal, on which the first user logs, and find, after finding the list of listeners of the first user, a received message index list of the corresponding listener according to an account of each listener in the first application, and add the index to of the message body the received message index list.

* * * * *